United States Patent
Tsiberidis (10) Patent No.: US 10,215,285 B2
(45) Date of Patent: Feb. 26, 2019

(54) SHAFT SEAL

(71) Applicant: GV ENGINEERING GMBH, Heimsheim (DE)

(72) Inventor: Konstantinos Tsiberidis, Heilbronn (DE)

(73) Assignee: GV ENGINEERING GMBH, Heimsheim (DE)

( * ) Notice: Subject to any disclaimer, the term of this patent is extended or adjusted under 35 U.S.C. 154(b) by 50 days.

(21) Appl. No.: 15/032,743

(22) PCT Filed: Oct. 27, 2014

(86) PCT No.: PCT/EP2014/072962
§ 371 (c)(1),
(2) Date: Apr. 28, 2016

(87) PCT Pub. No.: WO2015/063013
PCT Pub. Date: May 7, 2015

(65) Prior Publication Data
US 2016/0281854 A1    Sep. 29, 2016

(30) Foreign Application Priority Data
Oct. 28, 2013 (DE) .......................... 10 2013 017 879

(51) Int. Cl.
*F16J 15/324* (2016.01)
*F16J 15/3232* (2016.01)
(Continued)

(52) U.S. Cl.
CPC ......... *F16J 15/3232* (2013.01); *B60C 23/003* (2013.01); *F16C 33/6618* (2013.01);
(Continued)

(58) Field of Classification Search
CPC .... F16J 15/3232; F16J 15/324; B60C 23/003; F16C 33/6618; F16C 33/7823; F16C 33/7876; F16C 33/7889; F16C 41/005; F16C 19/184
(Continued)

(56) References Cited

U.S. PATENT DOCUMENTS 5,503,480 A    4/1996  Caillaut et al.
7,044,643 B2 *  5/2006  Greubel ............... F16C 19/184
                                                              184/5
(Continued)

FOREIGN PATENT DOCUMENTS

DE           2643769 A1   3/1978
DE        690 05 731 T2   4/1994
(Continued)

OTHER PUBLICATIONS

German Seach Report for German Application No. 102013017879.7 dated Jun. 13, 2014.
(Continued)

*Primary Examiner* — Nathan Cumar
(74) *Attorney, Agent, or Firm* — Carter, DeLuca, Farrell & Schmidt, LLP (57) ABSTRACT

A shaft seal is proposed, having an annular base body whereof one lateral surface forms a circumferential sealing surface and whereof the other, opposing, lateral surface has at least two circumferential sealing lips extending radially therefrom, between which an outwardly open outer cavity is delimited. To enable a coupling between a stationary body and a rotatable body arranged coaxially thereto which is suitable for pressure-medium transmission, the shaft seal is distinguished by a pressure-medium inlet in an outer wall of the base body and a pressure-medium outlet which leads into the outer cavity and is in fluid connection with the inlet.

15 Claims, 9 Drawing Sheets

(51) Int. Cl.
*B60C 23/00* (2006.01)
*F16C 33/78* (2006.01)
*F16C 33/66* (2006.01)
*F16C 41/00* (2006.01)
*F16C 19/18* (2006.01)

(52) U.S. Cl.
CPC ...... *F16C 33/7823* (2013.01); *F16C 33/7876* (2013.01); *F16C 33/7889* (2013.01); *F16C 41/005* (2013.01); *F16J 15/324* (2013.01); *F16C 19/184* (2013.01)

(58) Field of Classification Search
USPC ........................................................ 277/402
See application file for complete search history.

(56) References Cited

U.S. PATENT DOCUMENTS

| | | | | |
|---|---|---|---|---|
| 7,625,127 | B2* | 12/2009 | Foti | B60C 23/003 152/417 |
| 2003/0019692 | A1 | 1/2003 | Downes et al. | |
| 2004/0131475 | A1* | 7/2004 | Yokomachi | F04B 27/1036 417/269 |
| 2010/0109252 | A1* | 5/2010 | Matsui | F16J 15/324 277/559 |

FOREIGN PATENT DOCUMENTS

| | | |
|---|---|---|
| DE | 10019641 A1 | 11/2001 |
| DE | 102009057158 A1 | 6/2011 |
| DE | 102012217040 A1 | 3/2014 |
| EP | 1147925 A2 | 10/2001 |
| GB | 850767 A | 10/1960 |
| WO | 2014063873 A2 | 5/2014 |

OTHER PUBLICATIONS

International Search Report for International Application No. PCT/EP2014/072962 dated Jan. 30, 2015. (16 pages).

* cited by examiner

SHAFT SEAL

CROSS REFERENCE TO TELATED APPLICATIONS

This application is a national stage application of International Application No. PCT/EP2014/072962, filed on Oct. 27, 2014, which a claims the benefit of and priority to German Patent Application No, 10 2013 879.7, filed on Oct. 28, 2013, the entire contents of each of which are hereby incorporated by reference herein in their entireties.

TECHNICAL FIELD

The present invention relates to shaft seals in general and a shaft seal in particular, which is suitable for pressure-medium transmission between a stationary body and a rotatable body arranged coaxially thereto, wherein the shaft seal is intended to be arranged between the stationary body and the rotatable body.

BACKGROUND

Shaft seals are used in various fields of the technology for sealing between stationary bodies and rotatable bodies arranged coaxially thereto, for instance for sealing a rotating shaft with respect to a stationary housing or for sealing a stationary axle with respect to a hub rotating about the axle. The use of shaft seals is intended for example to prevent the exit of lubricant present in the clearance between the two bodies and also to prevent the entry of contaminants into the clearance.

In some fields of application, it can be necessary to produce a coupling between the stationary and the rotatable body, which is suitable for pressure-medium transmission. In vehicles, it is for example desirable to enable the transmission of compressed air from a stationary wheel axle into a wheel hub which is rotatably mounted on the wheel axle in order to thereby enable autonomous tire-pressure regulation to be carried out—even during the journey. In long distance haulage, for instance, the tire pressure can be adapted in this way to changes in load conditions, road surfaces or environmental temperatures.

To realise such a compressed-air transmission in vehicles, it has been proposed that, for sealing between the wheel axle and the wheel hub, two shaft seals, for example commercially available Simmerrings®, should be arranged at an axial spacing from one another in order to form a pressure-tight annular cavity between the shaft seals, through which compressed air can be transferred from a compressed-air line, which is provided on the wheel axle and leads into the cavity, into a compressed-air line which is provided on the wheel hub and leads out of the cavity. Arrangements of this type are disclosed for example in publications DE 10 2009 057 158 A1 and DE 690 05 731 T2. The solutions described therein have, however, proven to be of little use in practice owing to the spatial requirement which is generally too large for today's vehicle axles and owing to the service life being too short under the prevailing pressure load.

It is therefore the object of the invention to provide a solution with which a coupling which is suitable for the pressure-medium transmission can be realised in both space-saving and durable manner between a stationary body and a rotatable body arranged coaxially thereto.

SUMMARY

According to the invention, this object is achieved by a shaft seal having an annular base body whereof one lateral surface forms a sealing surface running in the circumferential direction and whereof the other, opposing, lateral surface has at least two circumferential sealing lips extending radially therefrom, between which an outwardly open outer cavity is delimited. The shaft seal is distinguished by a pressure-medium inlet in an outer wall of the base body and a pressure-medium outlet, which leads into the outer cavity and is in fluid connection with the inlet.

For sealing between a stationary body and a rotatable body arranged coaxially thereto, the shaft seal should be arranged between the two bodies in such a way that the sealing surface of the shaft seal, which is formed on the one lateral surface of the base body, abuts in sealing manner against a lateral surface of one of the two bodies, whilst the circumferential sealing lips extending radially on the other, opposing, lateral surface of the base body are in sealing contact with a lateral surface of the other of the two bodies. The surface referred to here as sealing surface is that surface of the shaft seal with which it adheres to one of the two bodies, generally through friction fit. Upon a rotational movement of the rotatable body, the shaft seal therefore adheres with its sealing surface to the lateral surface of the one of the two bodies and the circumferential sealing lips of the shaft seal slide in sealing manner on the lateral surface of the other of the two bodies.

The rotatable body (e.g. a shaft) can be arranged radially inside the shaft seal and the stationary body (e.g. a housing) can be arranged radially outside the shaft seal. In this case, the rotatable body will have a cylindrical shape and the stationary body will have a hollow cylindrical shape. However, it is also possible for the stationary body (e.g. an axle) to be arranged radially inside the shaft seal and the rotatable body (e.g. a hub) to be arranged radially outside the shaft seal so that the stationary body has a cylindrical shape and the rotatable body has a hollow cylindrical shape. The circumferential sealing surface of the shaft seal can be formed on the radially inner lateral surface or on the radially outer lateral surface of its base body and the circumferential sealing lips of the shaft seal are located on the respectively radially opposed lateral surface of its base body.

If the shaft seal is arranged in sealing manner between the stationary and the rotatable body, the outer cavity of the shaft seal, which is delimited between the circumferential sealing lips, is delimited by the lateral surface of the body, which is in sliding contact with the circumferential sealing lips, and therefore forms a pressure-tight, annular chamber which produces a coupling between the two bodies which is suitable for pressure-medium transfer. To realise a pressure-medium transmission between a pressure-medium line present on the stationary body and a pressure-medium line present on the rotatable body, the shaft seal should be mounted between the two bodies in such a way that the pressure-medium line present on the stationary body is connected in pressure-tight and fluid-conducting manner to the pressure-medium inlet of the shaft seal and the pressure-medium line present on the rotatable body is supplied from the annular chamber formed by the outer cavity. A pressure medium, for example compressed air, which is conducted into the shaft seal by way of the pressure-medium line present on the stationary body, is then conducted from the inlet to the outlet leading into the outer cavity and transferred from the outer cavity—regardless of the respective rotational position of the rotatable body—into the pressure-medium line present on the rotatable body. The shaft seal therefore serves as a pressure-tight coupling element whereof the outer cavity formed between the circumferential sealing lips provides a coupling space between the stationary and the rotatable body, which is suitable for pressure-medium transfer.

The pressure-medium inlet of the shaft seal can be arranged in any outer wall of the base body, for example in a lateral outer wall or in the outer wall which forms the sealing surface of the shaft seal which runs in the circumferential direction. If the inlet is formed in the said latter outer wall, the pressure-medium line present on the stationary body can be constructed inside the stationary body, for instance as a bore incorporated in the stationary body, whereof the exit opening should be brought into alignment with the pressure-medium inlet of the shaft seal. On the other hand, if the inlet is formed in a lateral outer wall of the base body, then the pressure-medium line of the stationary body can be guided outside on the stationary body in order to be connected to the pressure-medium inlet present in the lateral outer wall.

The fluid-conducting connection present between the inlet and the outlet in the shaft seal can be realised in various ways. For example, a channel which is formed in the material of the base body itself and connects the inlet to the outlet can be provided for this. It is also conceivable to guide a separate tubular line, made for example of metal or plastic material, from the inlet to the outlet. If the inlet of the shaft seal is formed in a lateral outer wall of the base body, a tubular line can also extend beyond the lateral outer wall of the shaft seal and have a connector which is suitable for connection to the pressure-medium line present on the stationary body.

A shaft seal of the type described is therefore particularly advantageous because it makes it possible to dispense with further components for realising the pressure-tight coupling space between the stationary and the rotatable body and therefore provides a very space-saving solution for the pressure-medium transmission. A further advantage is revealed during pressurisation. When a pressure medium is fed into the outer cavity, a sometimes significant overpressure (i.e. a pressure greater than the atmospheric pressure) is produced in the outer cavity. The circumferential sealing lips delimiting the outer cavity tend to be pushed apart axially by this overpressure so that, during pressurisation, only the circumferential sealing lips are placed under significant stress. By comparison with the prior art mentioned at the outset, in which the pressure applied always acts on the whole of the shaft seal sides, the result is a relative low component stress which increases the overall service life of such a solution.

According to an advantageous embodiment, the base body can have an inner cavity which is separated in pressure-tight manner from the outer cavity. This separation can be realised by a wall which separates the inner from the outer cavity and is either formed from the base-body material itself, i.e. constructed in one piece with the base body, or by a separate annular separating element which is made for example from metal or plastic material and is fastened in the base body. A line leading from the inlet to the outlet can lead at least partially through the inner cavity. The outlet leading into the outer cavity can likewise be arranged in the wall separating the two cavities from one another. An inner cavity of this type is also particularly suitable as a lubricant depot.

According to a further possible embodiment, provision can therefore be made for the inner cavity to contain a lubricant which can be used for the continuous lubrication of the dynamically stressed sliding surfaces of the circumferential sealing lips of the shaft seal. To guide a lubricant located in the interior of the cavity to the sliding surfaces of the circumferential sealing lips, at least one lubricant channel can extend from the inner cavity into at least one of the circumferential sealing lips and along the sliding surface of the relevant circumferential sealing lip. Lubricant which is present in the inner cavity can thus be delivered to the sliding surface of the circumferential sealing lip in order to lubricate this latter during a rotational movement of the rotatable body and therefore considerably increase the service life of the shaft seal.

To improve the sealing effect of the shaft seal in the region of the outer cavity, a further radially extending circumferential sealing lip can be present adjacent to at least one of the circumferential sealing lips delimiting the outer cavity, with an annular clearance being present between one of the circumferential sealing lips delimiting the outer cavity and a further adjacent circumferential sealing lip. Adjacent circumferential sealing lips of this type ensure an additional sealing of the outer cavity, which can be particularly necessary if the overpressure present in the outer cavity is so great that the circumferential sealing lips delimiting the cavity are no longer able to withstand it reliably on their own. In such an embodiment, provision can furthermore be made for at least one lubricant channel to extend from the inner cavity into the clearance between two adjacent circumferential sealing lips. Lubricant present in the inner cavity can then arrive in the clearance between the relevant adjacent circumferential sealing lips by way of this lubricant channel and lubricate the sliding surfaces of the adjacent circumferential sealing lips there.

In this embodiment, it is also conceivable for the circumferential sealing lips delimiting the outer cavity to have a smaller extent in the radial direction than their respectively adjacent circumferential sealing lips, so that, under normal pressure, the circumferential sealing lips delimiting the outer cavity are still at a spacing from the lateral surface of the body to be sealed and only undergo resilient deformation upon an overpressure in the outer cavity so that they come into sealing contact with the lateral surface of the body. In this way, the circumferential sealing lips delimiting the outer cavity are protected under normal pressure and the sealing effect of the shaft seal is nevertheless ensured by the respectively adjacent circumferential sealing lips.

According to a further development, the clearance between the adjacent circumferential sealing lips can be at least partially filled with a spongy foam material. "Spongy" here refers to a certain absorbency or the general suitability for liquid uptake. It goes without saying that, instead of a foam material, it is also possible to use other materials with comparable properties. Lubricant which enters this clearance from the inner cavity by way of a lubricant channel can be absorbed by the foam material and then distributed by this to the sliding surfaces of the adjacent circumferential sealing lips or to the lateral surface of the body which is in contact with the circumferential sealing lips. The foam material preferably fills the entire clearance between the adjacent circumferential sealing lips in order to achieve as complete a lubrication as possible of the sliding surfaces of the circumferential sealing lips. A spongy foam material can also be present in the inner cavity, which fills at least part of the inner cavity and covers an entry opening of the at least one lubricant channel. The arrangement of a foam material directly in front of or over a lubricant channel has the effect that lubricant located in the inner cavity does not flow immediately through the lubricant channel but is firstly absorbed and stored by the foam material to then be delivered gradually into the lubricant channel.

To form a lubricant depot which is suitable for providing lubricant, the inner cavity of the shaft seal can be sealed outwardly, in particular to the side. The inner cavity can then already be pre-filled with a lubricant at the time of manufacture of the shaft seal so that it can be used as a "self-lubricating" shaft seal. In another embodiment, a lateral outer wall of the shaft seal can be provided with at least one lubricant entry opening, which leads into the inner cavity. Lubricant, which is present in the clearance between the stationary and the rotatable body, for example in a bearing, can enter through an opening of this type into the inner cavity and be distributed from there to the sliding surfaces of the circumferential sealing lips through lubricant channels as described.

According to a further embodiment, a core, which is received in the base body and reinforces the base body, can be elongated in a region from which at least one circumferential sealing lip extends. The reinforcing core can also be elongated into at least one circumferential sealing lip. The core can also have a cross-sectional shape which is adapted substantially to the cross-sectional shape of the base body. The core here is always of a more stable construction than the base body —which typically comprises an elastomeric material—and can be realised for instance by a reinforcing ring made of metal, which is embedded in the material of the base body. In the event of an overpressure in the outer cavity, the base body or a circumferential sealing lip having a core is therefore stabilised so that it is better able to withstand the pressure.

In a further development, a portion of the core which is present in one of the circumferential sealing lips can be arranged such that it is pivotable with respect to the remainder of the core or jointed with respect to the remainder of the core. This can be achieved in that, in a transition region from a portion in the circumferential sealing lip to the remainder of the the core, the core has a material weakening, for example through the use of a more thinly constructed material or cutouts. It is likewise conceivable to construct the core with a plurality of parts so that a portion of the core which is present in the region of the circumferential sealing lip is separate from the remainder of the core. If a circumferential sealing lip delimiting the outer cavity is not in contact with the body to be sealed under normal pressure in the outer cavity, a pivotable arrangement of this type ensures that the circumferential sealing lip can deform sufficiently to come into sealing contact with the lateral surface of the body in the event of an overpressure in the outer cavity—in spite of the reinforcing effect achieved by the core.

According to one embodiment, the lateral outer walls of the shaft seal which delimit the inner cavity can be formed by the base body itself. According to a variant, it is however also conceivable for a lateral outer wall to be formed by a cover which is made for instance of metal or plastic material and fastened to the base body. A cover of this type, for example a sheet metal ring, can be clamped between the outer walls of the base body, which form the lateral surfaces of the base body, and seal the inner cavity to the side. With corresponding dimensions and a corresponding design, the cover can generate a contact-pressure force which presses the circumferential sealing lips against the lateral surface of the body which is in contact therewith in order to thereby improve the sealing effect of the shaft seal.

In a further embodiment, a lateral outer wall of the base body can be stabilised by a reinforcing element which is made for example of metal or plastic material and is mounted on the base body outside the lateral outer wall. An additional reinforcing element of this type can be of an annular construction and serves to support the base body laterally. It thereby particularly counteracts an axial moving-apart of the circumferential sealing lips in the event of an overpressure in the outer cavity.

According to yet another embodiment, the circumferential sealing lips delimiting the outer cavity can also be coupled axially to one another by at least one connecting element. A coupling of this type can be achieved for example by attaching one or more rigid connecting elements between the two circumferential sealing lips. The connecting elements here are preferably arranged in the region near to the sliding surfaces of the circumferential sealing lips. In this case, an axial coupling of this type helps to prevent the circumferential sealing lips from moving apart axially or even collapsing in the event of an overpressure in the outer cavity. The connecting element can also be of an annular construction, although it then has to have radial through openings so as not to impede or prevent the transmission of a pressure medium.

Finally, in a further embodiment, provision can be made for the circumferential sealing lips delimiting the outer cavity to have a different radial extent. This can be necessary for integrating the shaft seal in a specially constructed component. For example, if a ball bearing is used for rotatably mounting the rotatable body on the stationary body and this ball bearing has two ball races of which one protrudes axially beyond the other, then the shaft seal can be connected to the ball bearing in such a way that it abuts with its sealing surface which runs in the circumferential direction against the protruding part of the one ball race, and its circumferential sealing lip which does not extend as far is in contact with the inner surface of the other ball race whilst its radially further extending circumferential sealing lip is in contact with the lateral surface of one of the two bodies. The shaft seal then simultaneously forms a sealing outer skin for the ball bearing in the region between the ball races, which outer skin prevents dust and dirt particles from penetrating into the ball bearing and lubricant from exiting the ball bearing, and a coupling space for pressure-medium transmission between the two bodies. The shaft seal can already be integrated as a fixed component of the ball bearing during the manufacture of this latter and can be incorporated with the ball bearing as a unit in an axle assembly.

BRIEF DESCRIPTION OF THE DRAWINGS

A plurality of exemplary embodiments of a shaft seal according to the invention are explained in more detail below with reference to the accompanying schematic drawings, which show.

DETAILED DESCRIPTION

Figure 1:
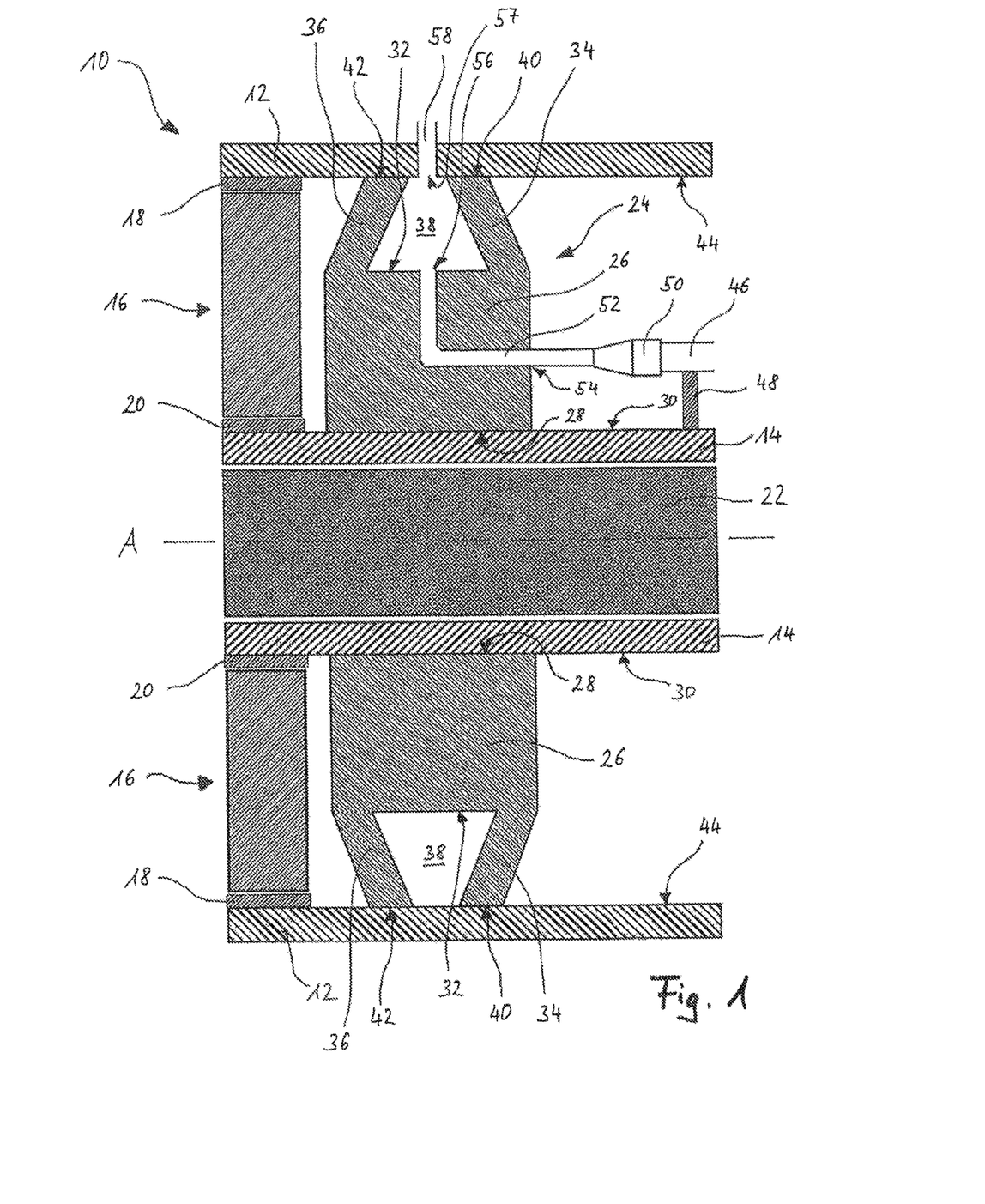
FIG. 1 is a longitudinal sectional view of a vehicle axle assembly with a shaft seal according to the invention.

For exemplification purposes, FIG. 1 shows an example application of a shaft seal according to the invention, which is capable of transmitting a pressure medium in a vehicle axle assembly 10 shown in a longitudinal section. It should be explicitly indicated that the application of the shaft seal in a vehicle axle assembly 10 is only used as an example. The chosen example merely serves for better understanding and enables the individual features of the shaft seal to be illustrated within the context of a concrete application. It goes without saying that a shaft seal according to the invention can also be used in other fields of application, for instance in gears, motors, centrifuges, washing machines and small kitchen appliances, to name just a few examples.

The vehicle axle assembly 10 illustrated in FIG. 1 comprises a hub 12, which is mounted on a cylindrical hollow axle body 14 such that it is rotatable about a longitudinal centre axis A. Within the context of the above embodiments, the axle body 14 forms a stationary body (fixed on the vehicle) and the hub 12 forms a rotatable body which is arranged coaxially thereto. The bearing of the hub 12 on the axle body 14 is realised by a ball bearing 16 whereof the radially outer ball race 18 is fixed to the hub 12 and the radially inner ball race 20 is fixed to the axle body 14. The hub 12 is connected by a fastening means (not illustrated in more detail) to a drive shaft 22 which runs through the axle body 14 and transmits the drive force generated by a motor (likewise not illustrated) to the hub 12 in order to rotate the latter about the axle body 14. A vehicle wheel (likewise not illustrated) can be fastened to the hub 12.

Arranged between the hub 12 and the axle body 14, axially adjacent to the ball bearing 16, is a shaft seal 24 whereof the annular base body 26 has a sealing surface, which is formed by the radially inner lateral surface 28 of the base body 26, runs in the circumferential direction and abuts flat against a radially outer lateral surface 30 of the axle body 14 so as to produce a sealing force-fitting connection with this latter. Two circumferential sealing lips 34 and 36 extend substantially radially outwards from a radially outer lateral surface 32 of the base body 26 and delimit an outer cavity 38 between them. The circumferential sealing lips 34 and 36 have, at their free ends, respective sliding surfaces 40 and 42 which are in sealing contact with a radially inner lateral surface 44 of the hub 12 and on which the lateral surface 44 of the hub 12 slides during a rotational movement of the hub 12 about the axle body 14. The outer cavity 38 is delimited radially outwards by the lateral surface 44 of the hub 12 and thus forms a pressure-tight annular chamber which produces a coupling between the hub 12 and the axle body 14 which is suitable for transmitting a pressure medium. More precisely, the outer cavity 38 is delimited by the circumferential sealing lips 34 and 36, the lateral surface 32 of the base body 26 and the lateral surface 44 of the hub 12.

Mounted on the axle body 14, there is a pressure-medium line 46 which can be connected to a pressure-medium source (not illustrated in more detail) present on board the vehicle, for example to a compressor for generating compressed air or a container with a pressurised tire-filling medium. The pressure-medium line 46 is fixed to the axle body 14 by a suitable holder 48 and is therefore stationary, as is the axle body 14. The pressure-medium line 46 is connected to a tubular line 52 in pressure-tight and fluid-conducting manner by way of a connector 50, which tubular line is guided through a pressure-medium inlet 54 of the shaft seal 24, which is present in a lateral outer wall of the base body 26. In the example shown, the line 52 is guided through the inlet 54 into the base body 26 and protrudes outwardly beyond the base body 26. However, the connector 50 can also be located directly at the inlet 54 and be constructed for example in the side wall of the base body 26. The line 52 does not need to be a separate component, but can be formed for example in one piece with the base body 26, for instance by mould-casting the line 52 together with the base body 26, which conventionally comprises an elastomeric material. The connector 50 can have a thread onto which the pressure-medium line 46 can be screwed. It goes without saying that the connection of a pressure-medium inlet provided on the shaft seal to a pressure-medium line provided on the axle body 14 can also be designed differently. It is therefore conceivable to guide the pressure-medium line through the axle body 14, for instance through a bore constructed in the axle body 14, and to bring the exit opening of the pressure-medium line into alignment with a pressure-medium inlet provided on the lateral surface 28 of the shaft seal. In the example shown, the line 52 leads through the base body 26 to an outlet 56 which is provided on the lateral surface 32 and leads into the outer cavity 38. Provided in the hub 12, there is a pressure-medium line 58 which is in fluid connection with the outer cavity 38 by way of an opening 57 in the lateral surface 44 and which, in its further progression, leads for example through a wheel rim (not illustrated here) to a valve of a tire mounted on the wheel rim. The pressure-medium line 58 can be realised for example by a bore constructed at least partially in the hub and rotates with the hub 12 during a rotational movement of the hub 12 about the axle body 14.

With the arrangement shown, it is possible to guide a pressure medium, for example compressed air or a tire-filling medium, which is supplied from the compressed-medium source via the compressed-medium line 46, into the outer cavity 38 via the line 52 and to transfer it from the outer cavity into the pressure-medium line 58—regardless of the respective rotational position of the hub 12. It is also possible to guide the pressure medium in the opposite direction, for example to discharge excess pressure from a vehicle tire. The pressure-medium line 58 is also always coupled to the pressure-medium line 46 in pressure-tight and fluid-conducting manner during a rotational movement of the hub 12 about the axle body 14, so that it is possible to supply or discharge a pressure medium not only when the vehicle is stationary but also during the journey when the hub 12 is rotating. A vehicle-autonomous tire-pressure regulation can therefore be realised simply and with few spatial requirements by means of the arrangement described.

With regard to further embodiments of the shaft seal 24, reference is now made to FIGS. 2 to 9 which each show different exemplary embodiments for the region of the vehicle axle assembly 10 shown in the upper half of FIG. 1 with the aid of a sectional detailed view. In each case here, the figure denoted with the suffix "a" shows the state of the arrangement under normal pressure and the figure denoted with the suffix "b" shows the state of the same arrangement in the event of an overpressure in the outer cavity 38. Similar or similar-acting elements are denoted by the same reference numerals in all figures, in each case supplemented by a separate lower-case letter to differentiate between the exemplary embodiments. Unless stated otherwise below, please refer to the explanations above in each case to explain elements referenced by the same numbers.

Figure 2A:
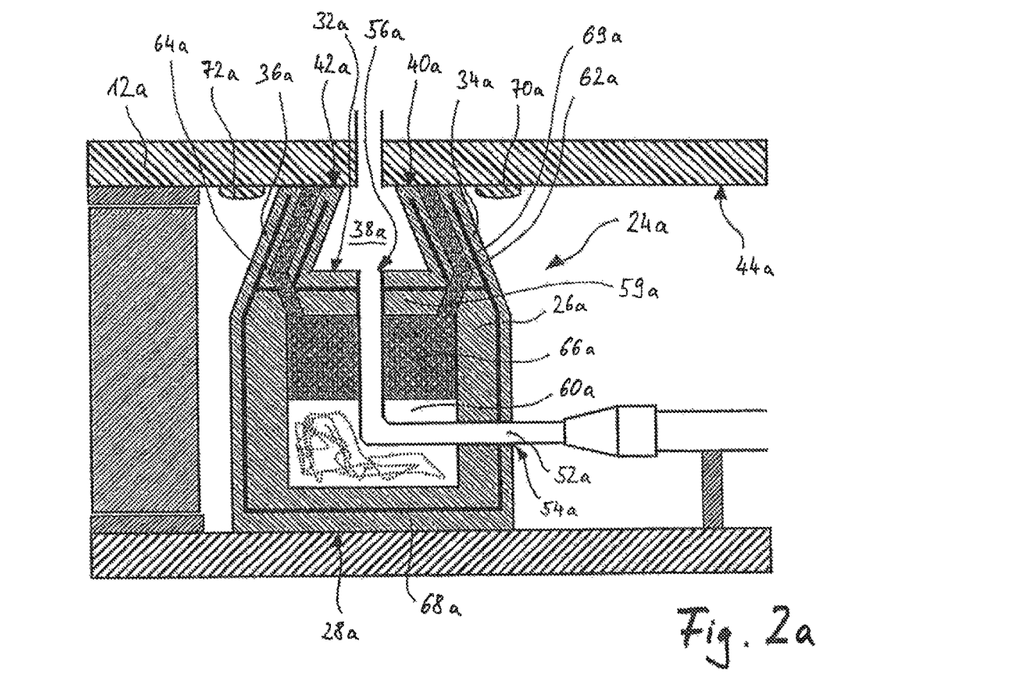
FIGS. 2a and 2b are a sectional detailed view of a first exemplary embodiment of a shaft seal with a reinforcing core, a lubricant-filled inner cavity and lubricant channels in the circumferential sealing lips.
Figure 2B:
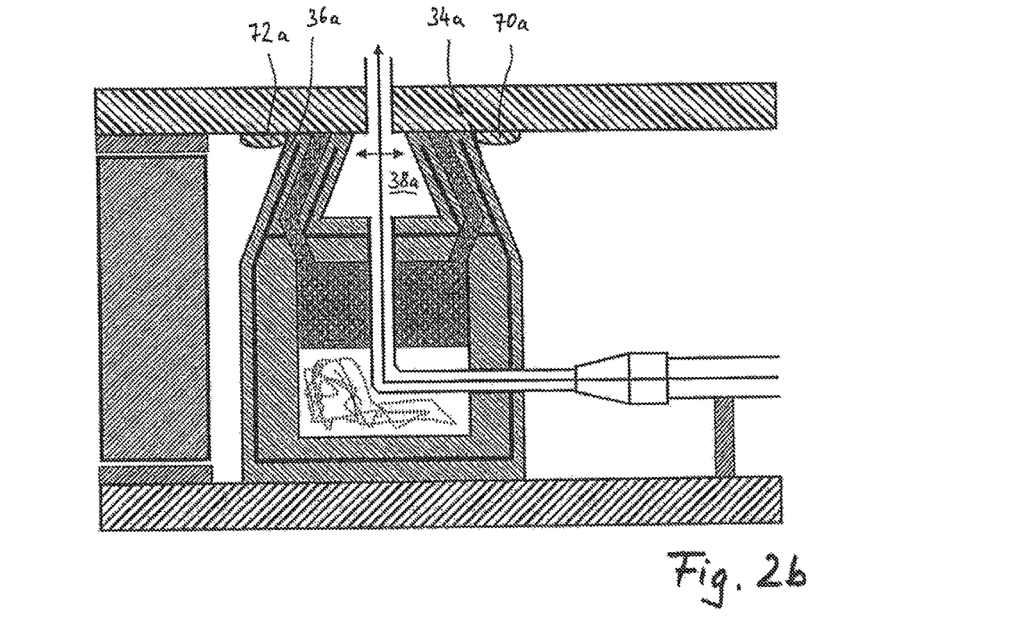

The shaft seal 24a illustrated in FIGS. 2a and 2b differs from the example shown in FIG. 1 in that it additionally has an inner cavity 60a which is separated from the outer cavity 38a in pressure-tight manner by a dividing wall 59a associated with the base body 26a. In this example, the outlet 56a is arranged in the dividing wall 59a and the line 52a is guided partially through the inner cavity 60a. The dotted wiggly line in the illustration of FIGS. 2a and 2b indicates that the inner cavity 60a is filled with a lubricant. So that lubricant which is present in the inner cavity 60a can be guided to the sliding surfaces 40a and 42a of the circumferential sealing lips 34a and 36a, lubricant channels 62a and 64a are provided, which extend from the inner cavity 60a in a substantially radial direction through the circumferential sealing lips 34a and 36a and terminate at the sliding surfaces 40a and 42a thereof. The inner cavity 60a therefore serves as a lubricant depot which delivers lubricant little by little to lubricate the circumferential sealing lips 34a and 36a sliding on the lateral surface 44a of the hub 12a.

Moreover present in the inner cavity 60a is a spongy foam material 66a, which fills a radially outer region of the inner cavity 60a and covers the entry openings of the lubricant channels 62a and 64a. The foam material 66a ensures that lubricant located in the inner cavity 60a does not flow unchecked through the lubricant channels 62a and 64a, but is firstly absorbed and stored by the foam material 66a to then be delivered gradually into the lubricant channels 62a and 64a. In the example shown, the lubricant channels 62a and 64a are themselves also filled with spongy foam material, although this is merely optional.

To improve its dimensional stability, the shaft seal 24a has an annular core 68a, which is embedded in the base body 26a of the shaft seal and has a cross-section which is substantially rectangular here and adapted to the cross-sectional shape of the base body 26a in order to reinforce the base body 26a in the region between the inner lateral surface 28a and the outer lateral surface 32a, and which extends with arms 69a into a region from which the circumferential sealing lips 34a and 36a extend, with the arms 69a in particular being elongated into the circumferential sealing lips 34a and 36a. The core 68a therefore not only brings about a reinforcement of the base body 26a but also a stabilising of the circumferential sealing lips 34a and 36a in such a way that they are better able to withstand an overpressure in the outer cavity 38a and, in particular, are not able to collapse laterally outwards.

To additionally counteract an excessive axial moving-apart of the circumferential sealing lips 34a and 36a in the event of an overpressure in the outer cavity 38a, ribs or projections 70a and 72a are present on the lateral surface 44a of the hub 12a, which extend in the circumferential direction of the hub 12a and against which the circumferential sealing lips 34a and 36a, which deform resiliently in the event of an overpressure in the outer cavity 38a, can abut in supported manner. This situation is illustrated in FIG. 2b. The projections 70a, 72a can be of a continuous or interrupted design in the circumferential direction.

Figure 3A:
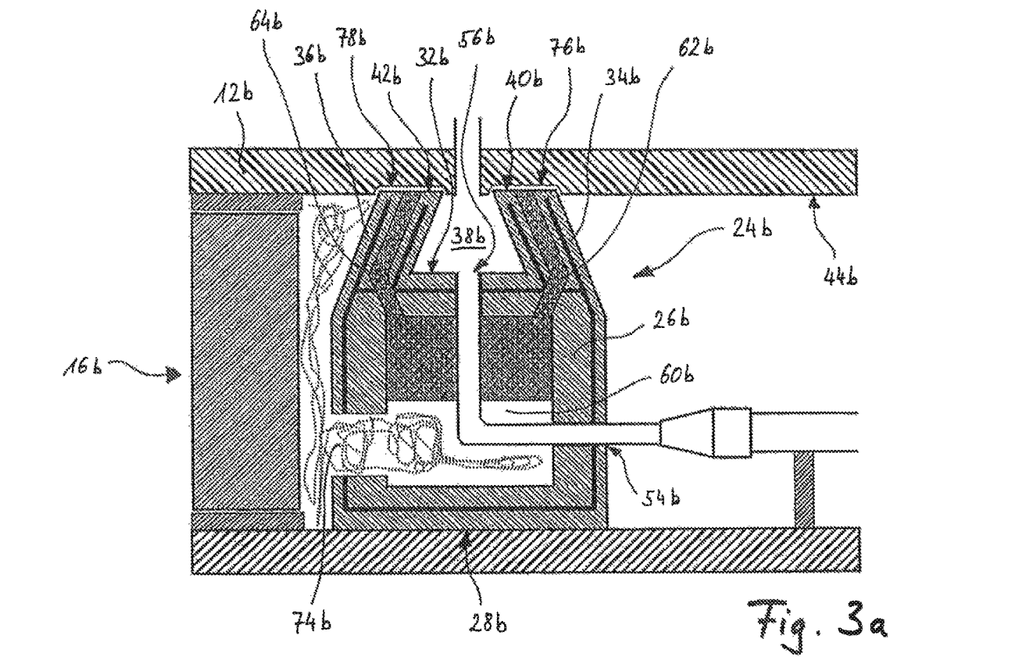
FIGS. 3a and 3b are a variant of the exemplary embodiment shown in FIGS. 2a and 2b.
Figure 3B:
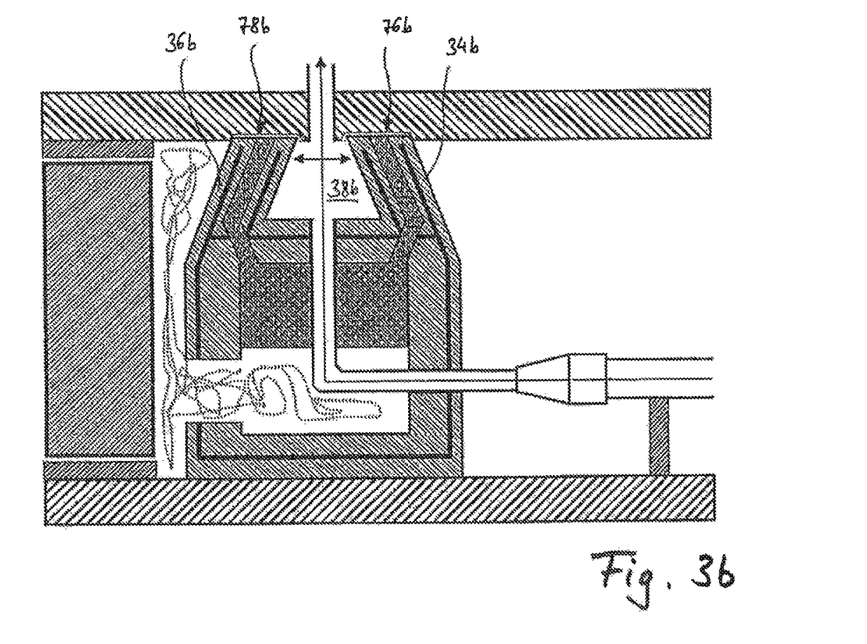

FIGS. 3a and 3b show an exemplary embodiment which has been slightly modified with respect to FIGS. 2a and 2b. The shaft seal 24b illustrated here differs from the example of FIGS. 2a and 2b in that the lateral outer wall of the base body 26b, which faces the ball bearing 16b, has a lubricant entry opening 74b which leads into the inner cavity 60b. Lubricant present in the region of the ball bearing 16b can therefore enter through the lubricant entry opening 74b into the inner cavity 60b and be distributed from there to the sliding surfaces 40b and 42b of the circumferential sealing lips 34b and 36b through the lubricant channels 62b and 64b.

The exemplary embodiment of FIGS. 3a and 3b further differs from that of FIGS. 2a and 2b in that the circumferential sealing lips 34b and 36b are of a somewhat longer construction in the radial direction and project into annular grooves 76b and 78b which are present on the lateral surface 44b of the hub 12b and extend in the circumferential direction of the hub 12b. In the event of an overpressure in the outer cavity 38b, the circumferential sealing lips 34b and 36b are pressed against the side walls of the annular grooves 76b and 68b—as illustrated in FIG. 3b. This support effectively prevents the two circumferential sealing lips 34b and 36 from moving apart excessively in the axial direction or collapsing.

Figure 4A:
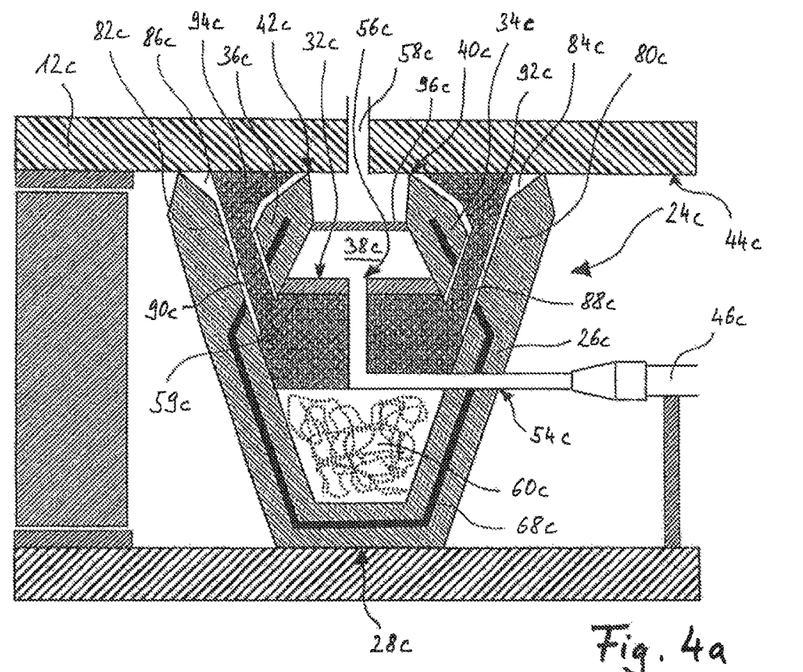
FIGS. 4a and 4b are a sectional detailed view of a second exemplary embodiment of a shaft seal with double circumferential sealing lips present on both sides of the outer cavity.
Figure 4B:
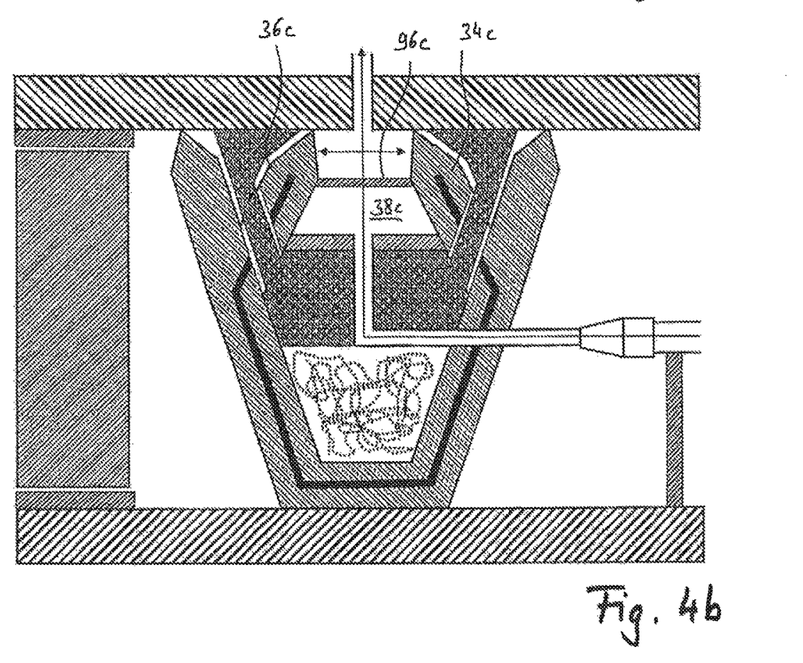

Another exemplary embodiment is shown in FIGS. 4a and 4b. The shaft seal 24c shown here differs from the example of FIGS. 2a and 2b substantially in that, adjacent to the two circumferential sealing lips 34c and 36c, there is an additional radially extending circumferential sealing lip 80c and 82c in each case. Annular clearances 84c and 86c are therefore formed between the respectively adjacent circumferential sealing lips 34c and 80c or 36c and 82c. In this exemplary embodiment, the lubricant channels 88c and 90c leading out of the inner cavity 60c do not extend to the sliding surfaces 40c and 42c of the circumferential sealing lips 34c and 36c, but lead into the clearances 84c and 86c. The clearances 84c and 86c are optionally virtually completely filled with spongy foam material 92c and 94c which results in lubricant which has arrived in the clearances 84c and 86c through the channels 88c and 90c firstly being absorbed and then distributed evenly to the sliding surfaces of the circumferential sealing lips 34c, 36c, 80c and 82c and the lateral surface 44c of the hub 12c.

The exemplary embodiment of FIGS. 4a and 4b moreover differs from that of FIGS. 2a and 2b in that the wall 59c separating the inner cavity 60c and the outer cavity 38c from one another is not constructed in one piece with the base body 26c, but is formed by a separate annular strip which is fixed in the material of the base body 26c and is made for example of plastic or metal. The reinforcing core 68c embedded in the base body 26c also has a form here which differs from that in the example of FIGS. 2a and 2b and has a trapezoidal cross-section which is adapted to the cross-sectional shape of the base body 26c.

In this example, the circumferential sealing lips 34c and 36c delimiting the outer cavity 38c are moreover coupled axially to one another by a connecting element 96c. The connecting element 96c ensures that the circumferential sealing lips 34c and 36c are held together in the event of an overpressure in the outer cavity 38c. The connecting element 96c can be continuous in the circumferential direction and have at least one opening so that pressure medium can arrive in the pressure-medium line 58c from the pressure-medium line 46c through the cavity 38c. However, instead of a continuous connecting element, it is also possible to fasten a plurality of individual connecting elements, for example in the form of individual webs or pins, between the circumferential sealing lips 34c and 36c, which connecting elements are spaced from one another in the circumferential direction. The connecting element 96c or a plurality of connecting elements can be constructed as a separate part in each case or in one piece with the base body 26c.

Figure 5A:
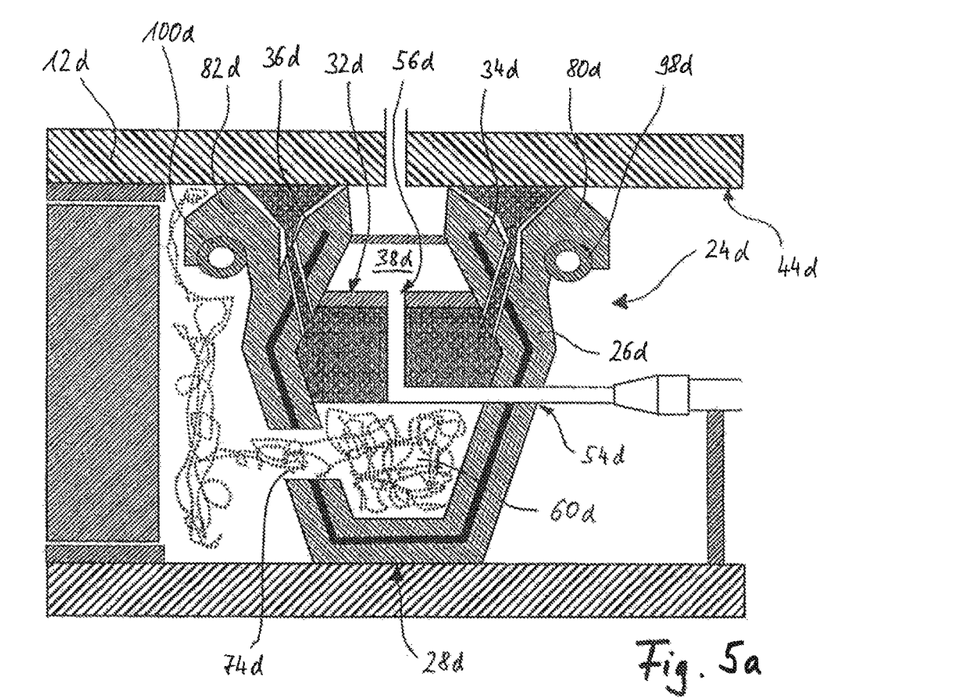
FIGS. 5a and 5b are a variant of the exemplary embodiment shown in FIGS. 4a and 4b.
Figure 5B:
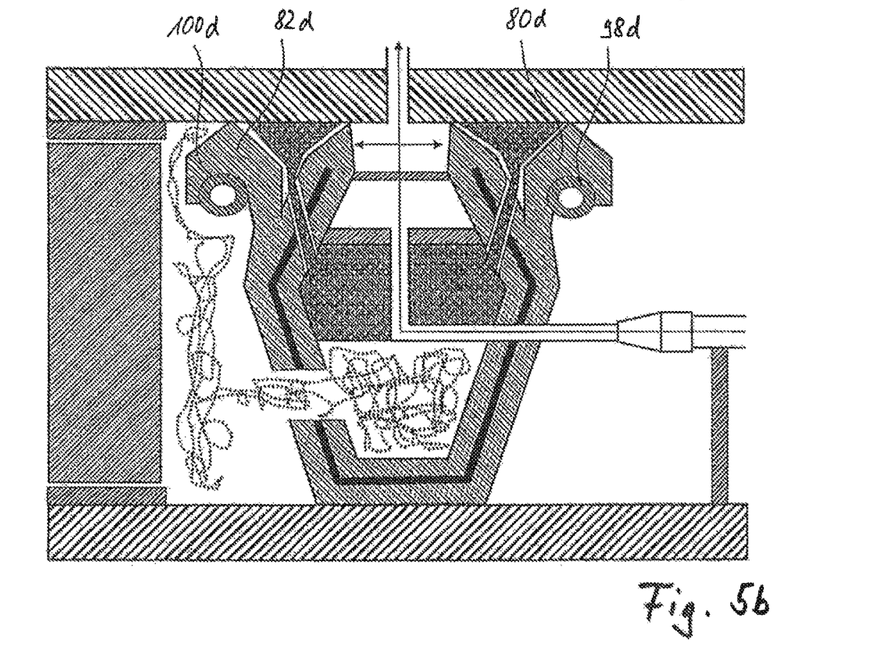

FIGS. 5a and 5b show a further development of the exemplary embodiment of FIGS. 4a and 4b. The shaft seal 24d illustrated here differs from the previous example in that—in a manner similar to that already shown in FIGS. 3a and 3b—a lubricant entry opening 74d, through which a lubricant present in the region of the ball bearing 16d can enter into the inner cavity 60d, is present in the lateral outer wall of the base body 26d, which faces the ball bearing 16d.

The example of FIGS. 5a and 5b further differs from that of FIGS. 4a and 4b in that tube springs 98d, 100d, which press the circumferential sealing lips 80d and 82d against the lateral surface 44d of the hub 12d, are mounted on the additional circumferential sealing lips 80d and 82d. This results in an even better sealing action.

Figure 6A:
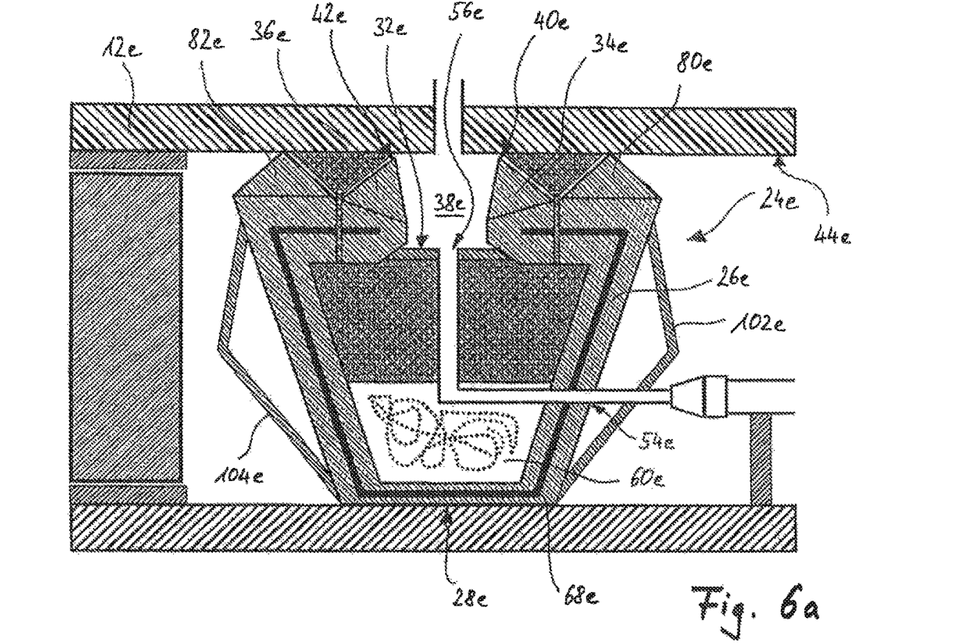
FIGS. 6a and 6b are a sectional detailed view of a third exemplary embodiment of a shaft seal with reinforcing elements fastened outside the lateral outer walls.
Figure 6B:
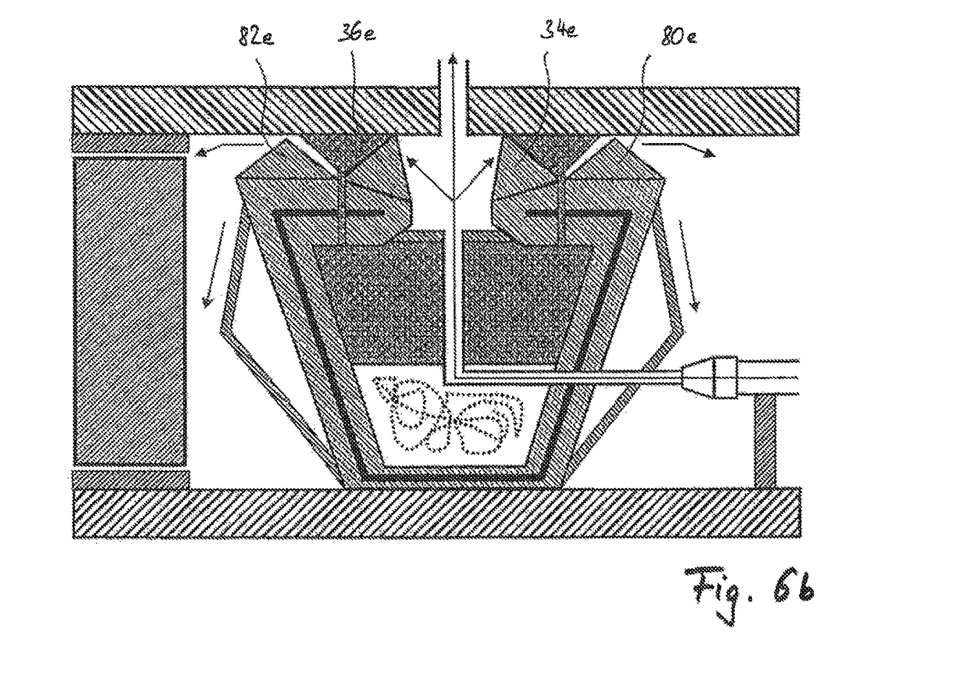

FIGS. 6a and 6b show a shaft seal 24e which differs from the example of FIGS. 4a and 4b substantially in that the lateral outer walls of the base body 26e are stabilised by reinforcing elements 102e and 104e mounted outside the lateral outer walls on the base body 26e. The reinforcing elements 102e and 104e can be formed for example by rings made of spring metal sheet, which are fastened to the lateral outer walls of the base body 26e and supported thereon.

Further characteristic of this exemplary embodiment is that—as shown in FIG. 6a—the sliding surfaces 40e and 42e of the circumferential sealing lips 34e and 36e are not in contact with the lateral surface 44e of the hub 12e under normal pressure in the outer cavity 38e, but only the sliding surfaces of the respectively adjacent circumferential sealing lips 80e and 82e. The reinforcing core 68e received in the base body 26e is moreover only elongated here in a region from which the circumferential sealing lips 34e, 36e, 80e and 82e extend, but does not itself reach into the circumferential sealing lips 34e, 36e, 80e and 82e. In the event of an overpressure in the outer cavity 38e—as illustrated in FIG. 6b—the circumferential sealing lips 34e, 36e, 80e and 82e tilt outwards in such a way that the circumferential sealing lips 34e and 36e now contact the lateral surface 44e of the hub 12e in sealing manner with their sliding surfaces 40e and 42e, but not the sliding surfaces of the circumferential sealing lips 80e and 82e. The reinforcing elements 102e and 104e stabilise the base body 26e during this tilting movement.

Finally, this example differs from that of FIGS. 4a and 4b in that the circumferential sealing lips 34e and 36e delimiting the outer cavity 38e are not coupled axially to one another.

Figure 7A:
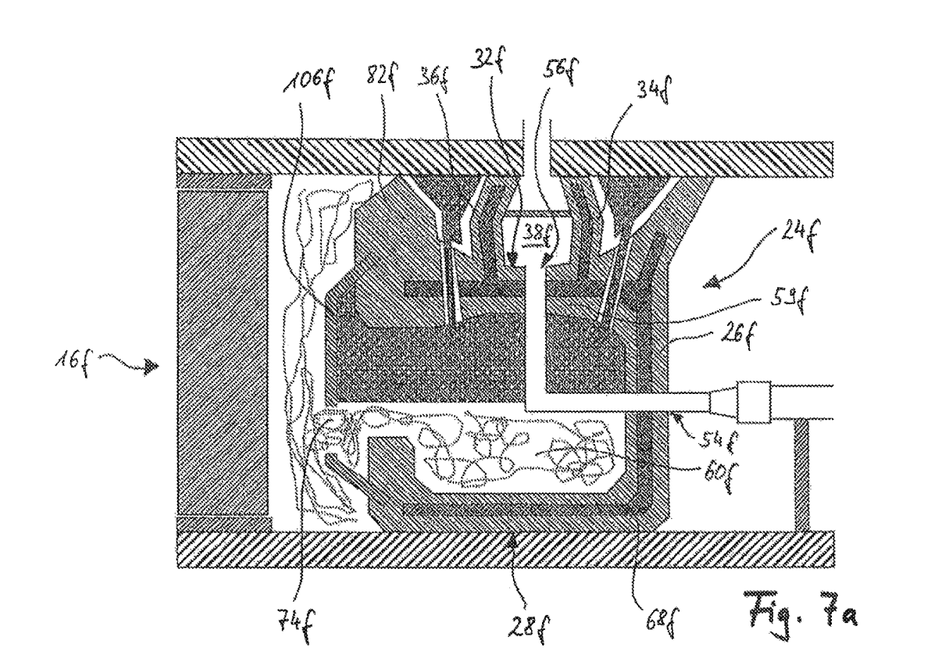
FIGS. 7a and 7b are a sectional detailed view of a fourth exemplary embodiment of a shaft seal with a cover which forms a lateral outer wall and has a lubricant entry opening leading into the inner cavity.
Figure 7B:
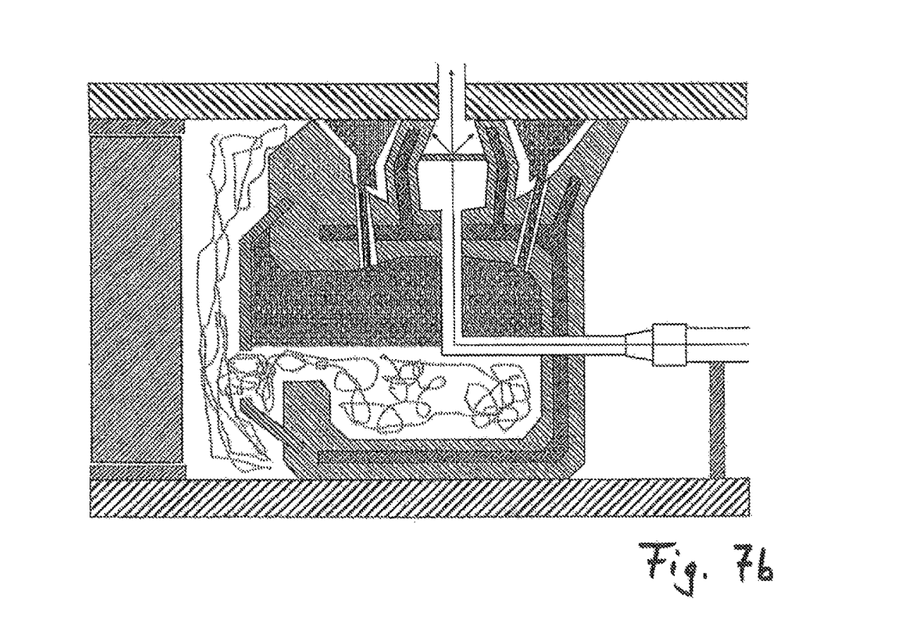

A further variant is shown in FIGS. 7a and 7b. The shaft seal 24f shown here differs from the exemplary embodiment of FIGS. 4a and 4b substantially in that, on the one hand, the wall 59f separating the inner cavity 60f and the outer cavity 38f is constructed in one piece with the base body 26f and, on the other hand, the lateral outer wall of the shaft seal 24f, which faces the ball bearing 16f, is not constructed such that it is materially integrated with the base body 26f, but is formed by a separate annular cover 106f mounted on the base body 26f. The cover 106f can be realised for example by an annular spring metal sheet which is clamped between the outer walls of the base body 26f which form the lateral surfaces 28f and 32f of the base body 26f. In a corresponding embodiment, the cover 106f can generate a contact-pressure force which is comparable to the tube springs 98d and 100d in the example of FIGS. 5a and 5b and acts on the circumferential sealing lips 36f and 82f. In the example shown, the cover 106f has one or more lubricant entry openings 74a through which lubricant which is present in the region of the ball bearing 16f can arrive in the inner cavity 60f. The cross-sectional shape of the base body 26f in this example moreover determines that the reinforcing core 68f embedded in the base body 26f has an approximately U-shaped cross-section.

Figure 8A:
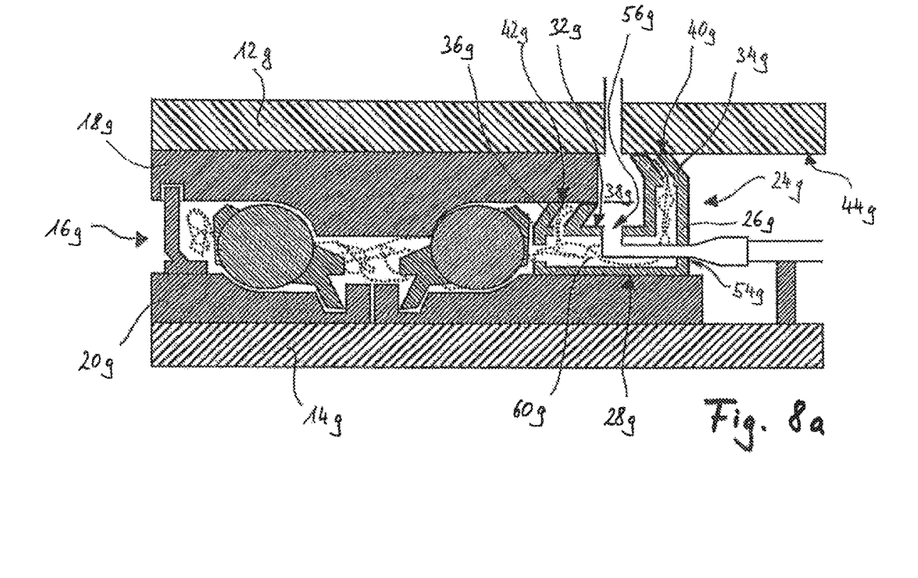
FIGS. 8a and 8b are a sectional detailed view of a fifth exemplary embodiment of a shaft seal which is integrated in a ball bearing and has a lubricant-filled inner cavity, a lubricant entry opening leading into the inner cavity and circumferential sealing lips which have a different radial extent.
Figure 8B:
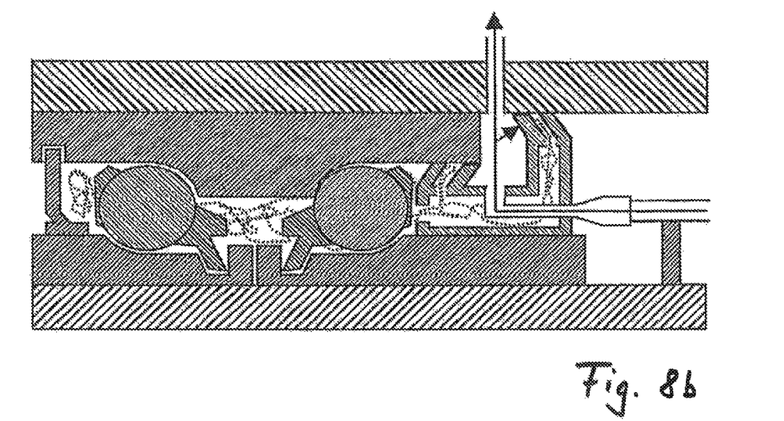
Figure 9A:
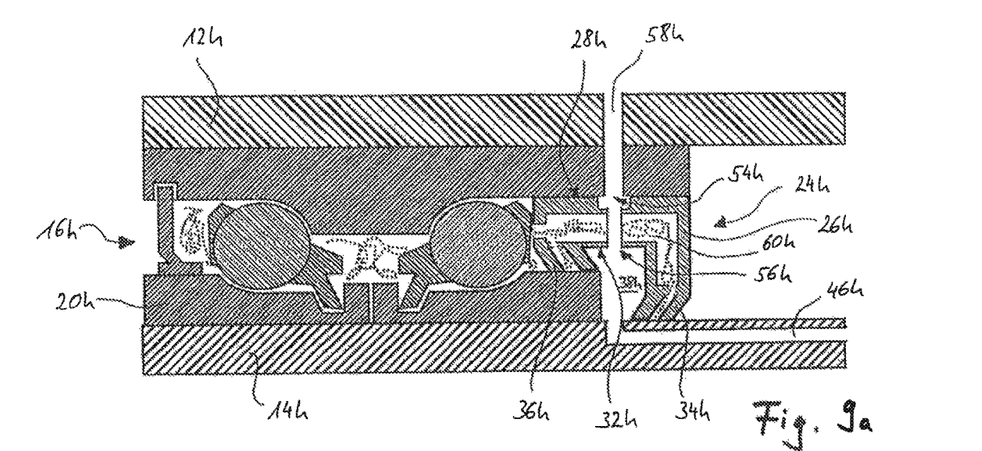
FIGS. 9a and 9b are a sectional detailed view of a sixth exemplary embodiment of a shaft seal which is integrated in a ball bearing and has radially inwardly arranged circumferential sealing lips.
Figure 9B:
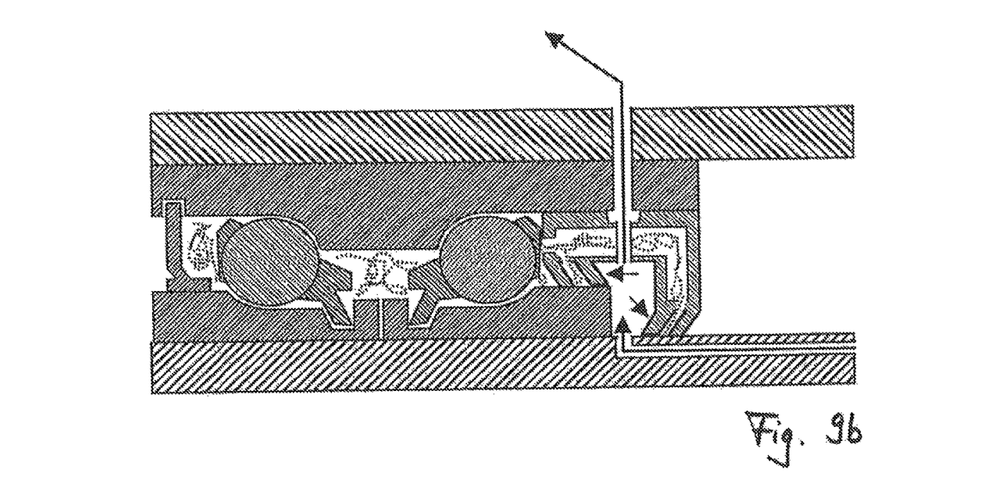

FIGS. 8a and 8b finally show a shaft seal 24g whereof the circumferential sealing lips 34g and 36g delimiting the outer cavity 38g have a different radial extent. The shaft seal 24g is integrated in a ball bearing 16g, for example in a so-called compact bearing. The ball race 20g of the ball bearing 16g, which is fixed to the axial body 14g, has a longer axial extent here than the ball race 18g fixed to the hub 12g, so that the ball race 20g protrudes axially over the ball race 18g as shown. The lateral surface 28g of the shaft seal base body 26g adheres to the protruding part of the ball race 20g for example through friction fit. The circumferential sealing lip 36g on the side of the shaft seal 24g which faces the ball bearing 16g extends radially to the ball race 18g so that the sliding surface 42g is in sealing contact with the ball race 18g. The other circumferential sealing lip 34g on the side of the shaft seal 24g which is remote from the ball bearing 16g extends radially further outwards to the hub 12g so that the sliding surface 40g of the circumferential sealing lip 34g is in sealing contact with the lateral surface 44g of the hub 12g. Apart from the different radial extent of the circumferential sealing lips 34g and 36g, the construction of the shaft seal 24g is substantially the same as that of the shaft seal 24b of FIGS. 3a and 3b.

It should have become clear from the above explanations that the features described with reference to FIGS. 1 to 8 can be combined with one another as desired and the exemplary embodiments shown are merely examples. This applies both to the features relating to the respective shaft seal and to the features of the other components of the vehicle axle assembly shown, for instance the ball bearing, the axle body or the hub. It is therefore readily possible for the ribs or annular grooves which are present on the hub and shown in FIGS. 2 and 3 to likewise be provided in the exemplary embodiments of the other figures. The features of the shaft seals, for example the separate lateral cover, the lateral reinforcing elements, the connecting elements coupling the circumferential sealing lips axially to one another, the lubricant entry openings provided in a lateral outer wall or the circumferential sealing lips with their radially different extents, which are described only with reference to individual figures, can likewise be readily combined with the exemplary embodiments of the other figures. The same likewise applies to the further features of the shaft seals described. Therefore, the double circumferential sealing lips which are present on both sides of the outer cavity, the different constructions of the lubricant channels, the reinforcing cores or the walls separating the inner and the outer cavity, or even the different fillings of spongy foam material can, for instance, also be provided in the shaft seals of those figures in which these features are not shown.

It also goes without saying that the constructions of the shaft seals shown in FIGS. 1 to 8 are only examples. It is clear to the person skilled in the art that the shaft seals can also be constructed and arranged differently. It is therefore readily possible to construct the shaft seals inversely to those in FIGS. 1 to 8, so that their circumferential sealing lips are constructed on the radially inner lateral surface. Such shaft seals then adhere radially outside on the hub and slide on the axle body with their circumferential sealing lips during a rotational movement of the hub. The pressure-medium line present on the axle body would be guided inside the axle body accordingly and the pressure-medium inlet of the shaft seal would be arranged such that it is in fluid-conducting connection with the pressure-medium line present on the hub. Such a case is shown by way of example in FIGS. 9a and 9a. The circumferential sealing lips 34h and 36h of the shaft seal 24h shown here, which is integrated in a ball bearing 16h, are constructed on the radially inner lateral surface 32h and slide on the axle body 14h or on the ball race 20h of the ball bearing 16h during a rotational movement of the hub 12h. The pressure-medium line 46h is guided inside the axle body 14h and is in fluid-conducting connection with the outer cavity 38h of the shaft seal 24h. The pressure-medium inlet 54h is constructed in the outer wall of the shaft seal 24h, which forms the radially outer lateral surface 28h, and is brought into alignment with the pressure-medium line 58h present in the hub 12h.

All example applications in which a shaft rotates in a stationary shaft housing are essentially conceivable. In such example applications, it is also possible for the circumferential sealing lips to be formed on the radially inner lateral surface of a shaft seal and to contact the shaft in sealing manner with their sliding surfaces whilst the radially outer lateral surface of the shaft seal adheres to the shaft housing. The inverse case is also possible when a shaft seal adheres to the shaft with its radially inner lateral surface and rotates with the shaft during a rotational movement of this latter, whilst the circumferential sealing lips on the radially outer lateral surface of the shaft seal slide along the shaft housing. In both cases, corresponding pressure-medium lines can be present on the shaft and the shaft housing, which pressure-medium lines are connected to one another in fluid-conducting manner by way of suitably arranged pressure-medium inlets of the shaft seals and their outer cavities which are delimited by the circumferential sealing lips.

The invention claimed is:

1. A shaft seal, comprising:
   an annular base body whereof one lateral surface forms a circumferential sealing surface and whereof the other, opposing, lateral surface has at least two circumferential sealing lips extending radially therefrom, between which an outwardly open outer cavity is delimited; and
   a pressure-medium inlet in an outer wall of the annular base body and a pressure-medium outlet, which leads into the outer cavity and is in fluid connection with the pressure-medium inlet,
   wherein the annular base body has an inner cavity which is separated from the outer cavity in pressure-tight manner,
   wherein at least one lubricant channel extends from the inner cavity into at least one of the at least two circumferential sealing lips, which leads to a sliding surface of the at least one of the at least two circumferential sealing lips, and
   wherein, present in the inner cavity, there is a spongy foam material which fills at least part of the inner cavity and covers an entry opening of the at least one lubricant channel.

2. A shaft seal, comprising:
   an annular base body whereof one lateral surface forms a circumferential sealing surface and whereof the other, opposing, lateral surface has at least two circumferential sealing lips extending radially therefrom, between which an outwardly open outer cavity is delimited; and
   a pressure-medium inlet in an outer wall of the annular base body and a pressure-medium outlet, which leads into the outer cavity and is in fluid connection with the pressure-medium inlet,
   wherein the annular base body has an inner cavity which is separated from the outer cavity in pressure-tight manner.

3. The shaft seal according to claim 2, wherein the pressure-medium outlet is arranged in a wall separating the inner and the outer cavity from one another.

4. The shaft seal according to claim 2, wherein at least one lubricant channel extends from the inner cavity into at least one of the at least two circumferential sealing lips, which leads to a sliding surface of the at least one of the at least two circumferential sealing lips.

5. The shaft seal according to claim 2, wherein, adjacent to at least one of the at least two circumferential sealing lips, there is a further radially extending circumferential sealing lip, with a clearance being present therebetween.

6. The shaft seal according to claim 5, wherein at least one lubricant channel extends from the inner cavity into the clearance between two adjacent circumferential sealing lips.

7. The shaft seal according to claim 6, wherein the clearance between the two adjacent circumferential sealing lips is filled at least partially with a spongy foam material.

8. The shaft seal according to claim 2, wherein the inner cavity contains a lubricant.

9. The shaft seal according to claim 2, wherein a lateral outer wall of the annular base body has at least one lubricant entry opening, which leads into the inner cavity.

10. The shaft seal according to claim 2, wherein a core, which is received in the annular base body and reinforces the annular base body, is elongated into a region from which at least one of the at least two circumferential sealing lips extends.

11. The shaft seal according to claim 10, wherein the reinforcing core is elongated into at least one of the at least two circumferential sealing lips.

12. The shaft seal according to claim 2, wherein a lateral outer wall of the annular base body is formed by a cover mounted on the base body.

13. The shaft seal according to claim 2, wherein a lateral outer wall of the annular base body is stabilised by a reinforcing element mounted outside the lateral outer wall on the annular base body.

14. The shaft seal according to claim 2, wherein the at least two circumferential sealing lips delimiting the outer cavity are coupled axially to one another by at least one connecting element.

15. The shaft seal according to claim 2, wherein the at least two circumferential sealing lips delimiting the outer cavity have a different radial extent.

* * * * *